March 20, 1973     J. D. LAKES     3,721,536

GAS SAFETY DEVICE

Filed Jan. 26, 1971

INVENTOR
JOHN D. LAKES

BY *J. Gibson Semmes*

ATTORNEY 3,721,536
GAS SAFETY DEVICE
John D. Lakes, 762 Ross Ave., Hamilton, Ohio 45013
Filed Jan. 26, 1971, Ser. No. 109,773
Int. Cl. F17d 3/04; F16l 5/00
U.S. Cl. 48—193                                    2 Claims

ABSTRACT OF THE DISCLOSURE

Device for trapping gas leaks at the juncture of a gas lead-in pipe and a building wall, including an exhaust pipe having a flexible connection to the trap chamber to allow for shifting between portions of the building.

DESCRIPTION OF THE PREFERRED EMBODIMENTS

Figure 1:
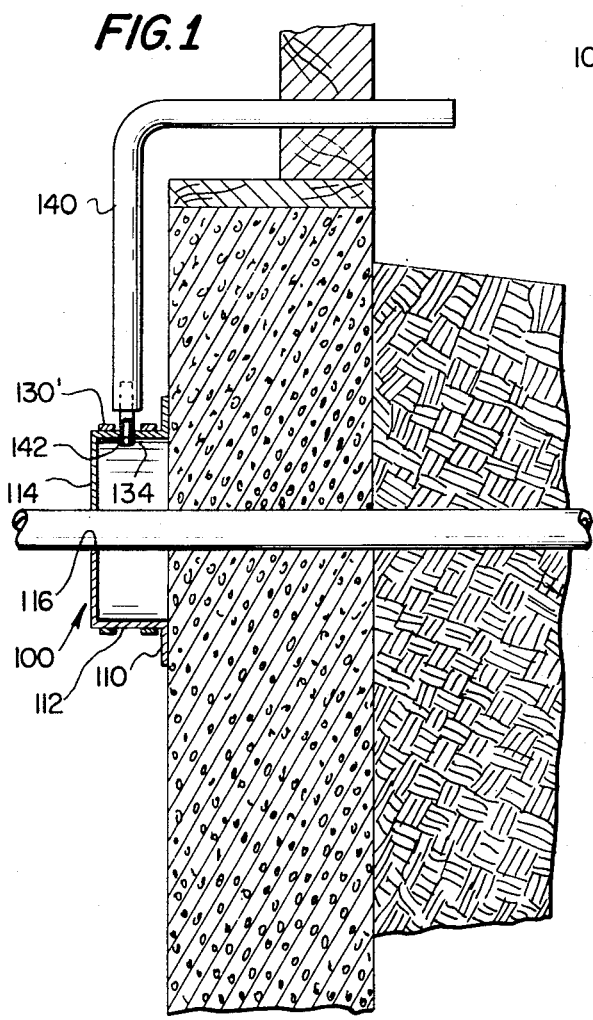
FIG. 1 is a vertical sectional view of invention showing the component parts installed in a basement foundation.
Figure 2:
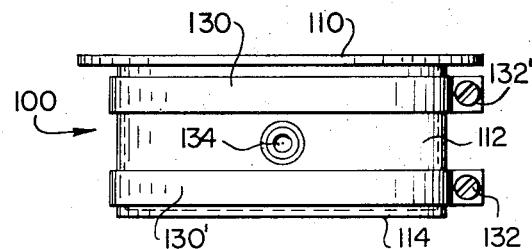
FIG. 2 is a top plan view of invention taken along the lines 2—2 of FIG. 1.
Figure 3:
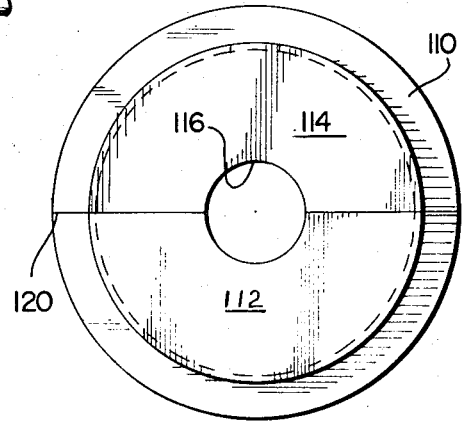
FIG. 3 is an end view of invention.

The gas safety device 100 which is adapted to a conventional gas lead-in pipe, comprises essentially the following components. Semi-circular trap components 114 and 112 are adapted to fit together to form the circular or cylindrical housing, the same having an aperture 116 to accommodate the gas lead-in pipe, these being divided by the break-line or medial connection 120. Suitable clamping means 130 and 130' bearing the fasteners 132 and 132' respectively may be adapted to opposite sides of the aperture 134, said aperture being effective to secure the adapter 142, emanating from the exhaust pipe 140 which may be of L construction and may extend vertically through the upper portion of the building construction to the atmosphere. Obviously, suitable seals may be applied to the aperture 116, aperture 134 and break line 120 as well as to the flanges 110, which abut the masonry wall, shown in section, and through which the gas lead-in pipe passes and is secured. Adapter 142 may be of flexible material to permit differential shifting between respective subterranean and above ground elements of the building construction.

I claim:

1. A gas safety conductor for installation interiorly of building constructions, comprising in combination with a gas lead-in line:
   (A) upper and lower complemental lead-in line engaging trap members, supported by the lead-in line, said trap members each having a flange at their inner extremities to abut the building and defining a lead-in line aperture at their respective outer extremities, the aperture sealably engaging the lead-in line for support thereon;
   (B) at least one clamping member surrounding the complemental trap members and the clamping member in sealing relation to the lead-in line, to the building and to each other;
   (C) an upstanding exhaust pipe, emanating from an aperture defined by the upper of said trap members, said pipe extending through the upper portion of the building construction to the atmosphere;
   (D) a tubular adapter, connecting the upper of said trap members with the exhaust pipe, said adapter being flexible to permit differential shifting between elements of the building construction.

2. The gas safety conductor of claim 1 including:
   (E) seals at the medial connection of the trap members and at the point of engagement of the respective members with the lead-in pipe.

References Cited

UNITED STATES PATENTS

| | | | |
|---|---|---|---|
| 3,436,197 | 4/1969 | Borst et al. | 48—192 |
| 2,108,840 | 2/1938 | Anthony | 48—193 |
| 2,438,619 | 3/1948 | Rattay | 48—194 X |
| 2,744,815 | 5/1956 | Heck | 285—13 X |
| 2,871,113 | 1/1959 | Hammers | 48—192 |
| 3,246,968 | 4/1966 | Bailey | 48—193 |
| 3,338,254 | 8/1967 | Regal | 48—193 X |

MORRIS O. WOLK, Primary Examiner

D. G. MILLMAN, Assistant Examiner

U.S. Cl. X.R.

285—13